(12) United States Patent
Jozaki et al.

(10) Patent No.: US 12,341,379 B2
(45) Date of Patent: Jun. 24, 2025

(54) ROTOR

(71) Applicant: TOYOTA JIDOSHA KABUSHIKI KAISHA, Toyota (JP)

(72) Inventors: Ken Jozaki, Seto (JP); Toshinori Okochi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 18/308,033

(22) Filed: Apr. 27, 2023

(65) Prior Publication Data

US 2023/0402886 A1 Dec. 14, 2023

(30) Foreign Application Priority Data

Jun. 9, 2022 (JP) ................................. 2022-093735

(51) Int. Cl.
*H02K 1/27* (2022.01)
*H02K 1/276* (2022.01)
*H02K 29/03* (2006.01)

(52) U.S. Cl.
CPC ........... *H02K 1/2766* (2013.01); *H02K 29/03* (2013.01)

(58) Field of Classification Search
CPC ............................ H02K 1/2766; H02K 29/03
See application file for complete search history.

(56) References Cited

U.S. PATENT DOCUMENTS

| 2006/0163967 A1* | 7/2006 | Yamamoto | H02K 1/06 310/216.057 |
| 2022/0060071 A1* | 2/2022 | Xiao | H02K 1/274 |

FOREIGN PATENT DOCUMENTS

| JP | 2003-284274 A | 10/2003 |
| JP | 2015-33167 A | 2/2015 |

* cited by examiner

*Primary Examiner* — Thomas Truong
(74) *Attorney, Agent, or Firm* — Sughrue Mion, PLLC

(57) ABSTRACT

A rotor includes a rotor core formed by stacking electromagnetic steel sheets having anisotropy, which means that magnetic characteristics of the electromagnetic steel sheets in a first direction along a rolling direction are different from magnetic characteristics of the electromagnetic steel sheets in a second direction obtained by rotating the first direction by 90°, the rotor core having 4n magnetic pole portions formed along a circumferential direction, and magnets mounted in the rotor core in each of the magnetic pole portions. The 4n magnetic pole portions include a first magnetic pole portion formed in a region including the first direction and a second magnetic pole portion formed in a region including the second direction, and a total magnetic flux amount of the magnets per pole of the second magnetic pole portion is larger than a total magnetic flux amount of the magnets per pole of the first magnetic pole portion.

5 Claims, 11 Drawing Sheets

ROTOR

CROSS-REFERENCE TO RELATED APPLICATION

This application is based upon and claims the benefit of priority of the prior Japanese Patent Application No. 2022-093735, filed on Jun. 9, 2022, the entire contents of which are incorporated herein by reference.

FIELD

The present disclosure relates to a rotor.

BACKGROUND

Conventionally, there is known a rotor for a rotary electric machine including a rotor core formed by stacking a plurality of electromagnetic steel sheets as disclosed in, Japanese Patent Application Laid-Open No. 2015-033167 (Patent Document 1).

SUMMARY

Meanwhile, the electromagnetic steel sheet used for the rotor core is rolled in the manufacturing process thereof and may have anisotropy in which magnetic characteristics differ depending on a direction with respect to the rolling direction. Such an influence of anisotropy also appears in a rotor core formed by stacking electromagnetic steel sheets. In the rotor core, a plurality of magnetic pole portions are formed along the circumferential direction, and the magnetic pole portions have different magnetic characteristics under the influence of the anisotropy of the electromagnetic steel sheets. That is, in the rotor core using the electromagnetic steel sheet, the magnetic pole portions having different magnetic characteristics are arranged along the rotation direction. Therefore, torque ripple indicating the amount of torque fluctuation when the rotor core rotates may increase.

Therefore, an object of the present disclosure is to reduce torque ripple in a rotor having a rotor core formed by stacking electromagnetic steel sheets.

In one aspect of the present disclosure, there is provided a rotor including: a rotor core formed by stacking electromagnetic steel sheets having anisotropy, the anisotropy meaning that magnetic characteristics of each of the electromagnetic steel sheets in a first direction along a rolling direction are different from magnetic characteristics of each of the electromagnetic steel sheets in a second direction obtained by rotating the first direction by 90°, the rotor core having 4n (n is a natural number) magnetic pole portions formed along a circumferential direction; and magnets mounted in the rotor core in each of the magnetic pole portions, wherein the 4n magnetic pole portions include a first magnetic pole portion formed in a region including the first direction and a second magnetic pole portion formed in a region including the second direction, and wherein a total magnetic flux amount of the magnets per pole of the second magnetic pole portion is larger than a total magnetic flux amount of the magnets per pole of the first magnetic pole portion.

In the above rotor, a total cross-sectional area of the magnets per pole of the second magnetic pole portion may be larger than a total cross-sectional area of the magnets per pole of the first magnetic pole portion in a cross section orthogonal to a stacking direction of the electromagnetic steel sheets.

In the above rotor, the number of the magnets per pole of the first magnetic pole portion may be equal to the number of the magnets per pole of the second magnetic pole portion, each of the magnets may be a rectangular parallelepiped, each of the magnets may have a first side extending in a direction along a magnetic pole face and a second side extending in a direction along a magnetization easy direction in a cross section orthogonal to a stacking direction of the electromagnetic steel sheets, and the first side in the second magnetic pole portion may be longer than the first side in the first magnetic pole portion.

In the above rotor, the first magnetic pole portion may include a first center bridge formed between magnet-mounting holes adjacent to each other across a d-axis extending along a radial direction, the second magnetic pole portion may include a second center bridge formed between magnet mounting-holes adjacent to each other across a d-axis extending along a radial direction, and a width in a circumferential direction of the first center bridge may be wider than a width in a circumferential direction of the second center bridge.

In the above rotor, a magnetic flux density of the magnets mounted in the second magnetic pole portion may be higher than a magnetic flux density of the magnets mounted in the first magnetic pole portion.

DETAILED DESCRIPTION

Figure 1A:
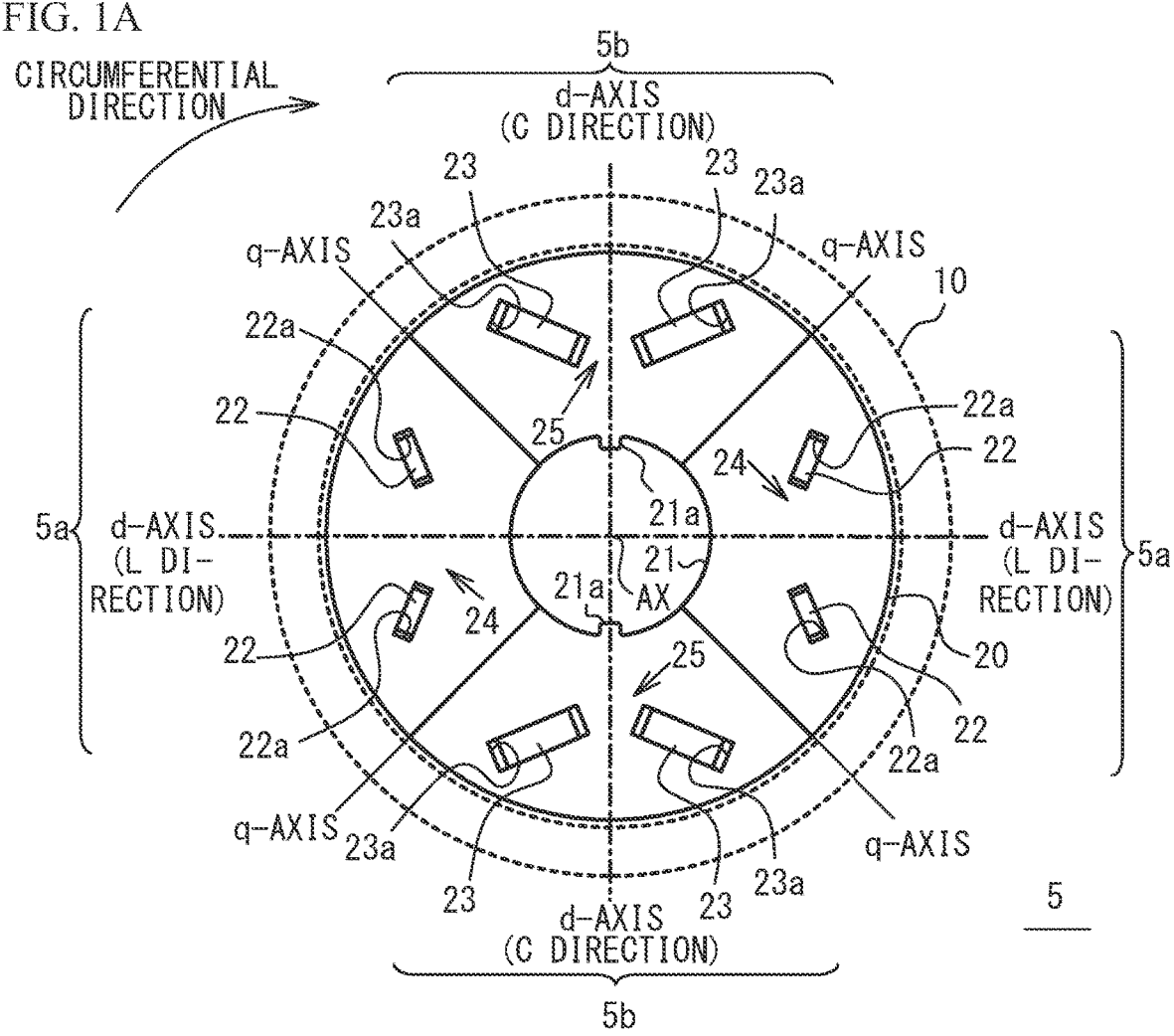
FIG. 1A is a cross-sectional view of a rotor of a first embodiment taken in a direction orthogonal to a stacking direction of electromagnetic steel sheets.

Hereinafter, embodiments of the present disclosure will be described with reference to the accompanying drawings. However, in the drawings, the dimensions, ratios, and the like of each part may not be illustrated so as to completely match the actual ones. Further, details may be omitted in some drawings.

First Embodiment

[Configuration of Rotor]

First, an overview of a rotor 5 in accordance with a first embodiment will be described with reference to FIG. 1A and FIG. 1B. The rotor 5 includes a rotor core 20, first permanent magnets 22 attached to the rotor core 20, and second permanent magnets 23 attached to the rotor core 20. The rotor core 20 is concentrically disposed inside a stator 10 having a substantially cylindrical shape and is provided rotatably with respect to the stator 10. The rotor 5 forms an interior permanent magnet (IPM) type rotary electric machine together with the stator 10. The rotary electric machine is used as, for example, an electric motor, a generator, or a motor generator having both functions of an electric motor and a generator. The stator 10 in the present embodiment is composed of three phases: a U phase, a V phase, and a W phase, and includes stator coils, but the stator coils are not illustrated in FIG. 1A. The rotary electric machine may be of not only an IPM type but also a surface permanent magnet (SPM) type.

In the following description, the "axial direction", the "radial direction", and the "circumferential direction" refer to the axial direction of the rotor core, the radial direction of the rotor core, and the circumferential direction of the rotor core, respectively.

Figure 1B:
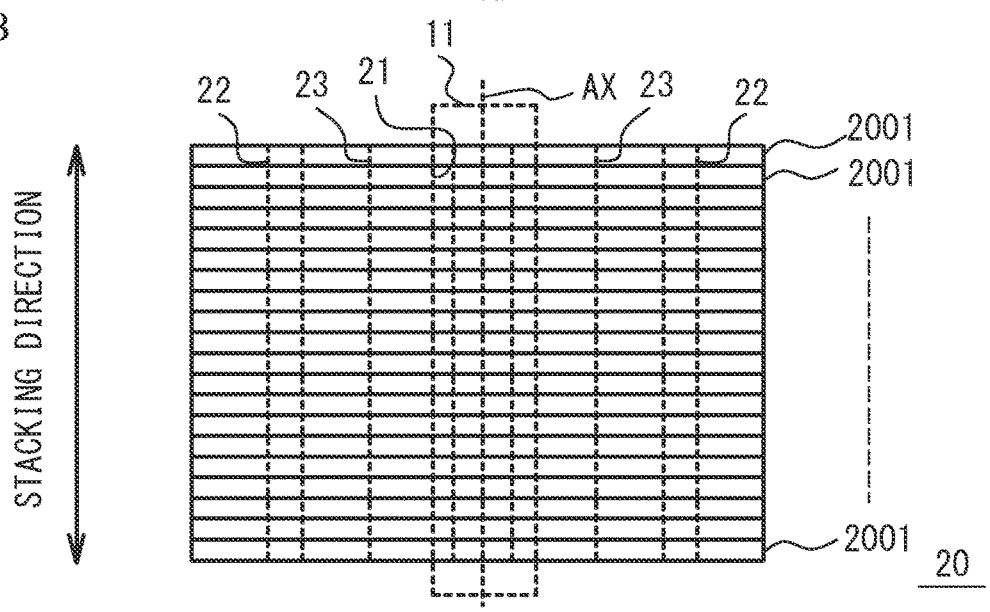
FIG. 1B is a side view of the rotor core in the first embodiment.

As illustrated in FIG. 1A, the rotor core 20 has a rotation shaft mounting hole 21 at its center. As illustrated in FIG. 1B, a rotation shaft member 11 is attached to the rotation shaft mounting hole 21. The rotation shaft mounting hole 21 is provided with key projections 21a projecting inward. The key projections 21a are provided at two positions separated by 180°. The key projections 21a are engaged with respective key grooves 11a of the rotation shaft member 11 illustrated in FIG. 3.

The rotor core 20 includes four magnetic pole portions arranged along the circumferential direction. Specifically, the rotor core 20 includes two first magnetic pole portions 5a and two second magnetic pole portions 5b arranged along the circumferential direction. The two first magnetic pole portions 5a are provided at positions separated by 180°. The two second magnetic pole portions 5b are provided at positions separated by 180°. The first magnetic pole portions 5a and the second magnetic pole portions 5b are alternately disposed in the circumferential direction. The first magnetic pole portion 5a and the second magnetic pole portion 5b adjacent to each other have a positional relationship in which the position of one of them is the position obtained by rotating the other by 90°. The polarities of the first magnetic pole portions 5a and the second magnetic pole portions 5b are alternately reversed in the circumferential direction. For example, when the polarities of the two first magnetic pole portions 5a are both the south poles, the polarities of the two second magnetic pole portions 5b are both the north poles.

Each of the magnetic pole portions has a sector shape in which the q-axis is disposed at both side ends. In each magnetic pole portion, the d-axis passes through the central portion of the sector shape along the radial direction. When the direction in which the d-axis extends in the first magnetic pole portion 5a is defined as a first direction and the direction in which the d-axis extends in the second magnetic pole portion 5b is defined as a second direction, the second direction is a direction obtained by rotating the first direction by 90°. The first direction and the second direction are related to the rolling direction of the electromagnetic steel sheet forming the rotor core 20. The rolling direction of the electromagnetic steel sheet will be described later. Therefore, the first direction and the second direction will also be described later in detail together with the rolling direction of the electromagnetic steel sheet.

Although four magnetic pole portions are formed in the present embodiment, the number of magnetic pole portions may be 4n (n is a natural number). For example, the number of magnetic pole portions may be eight, twelve, or a larger number of magnetic pole portions may be provided.

[Rolling Direction, L Direction, and C Direction]

Figure 2A:
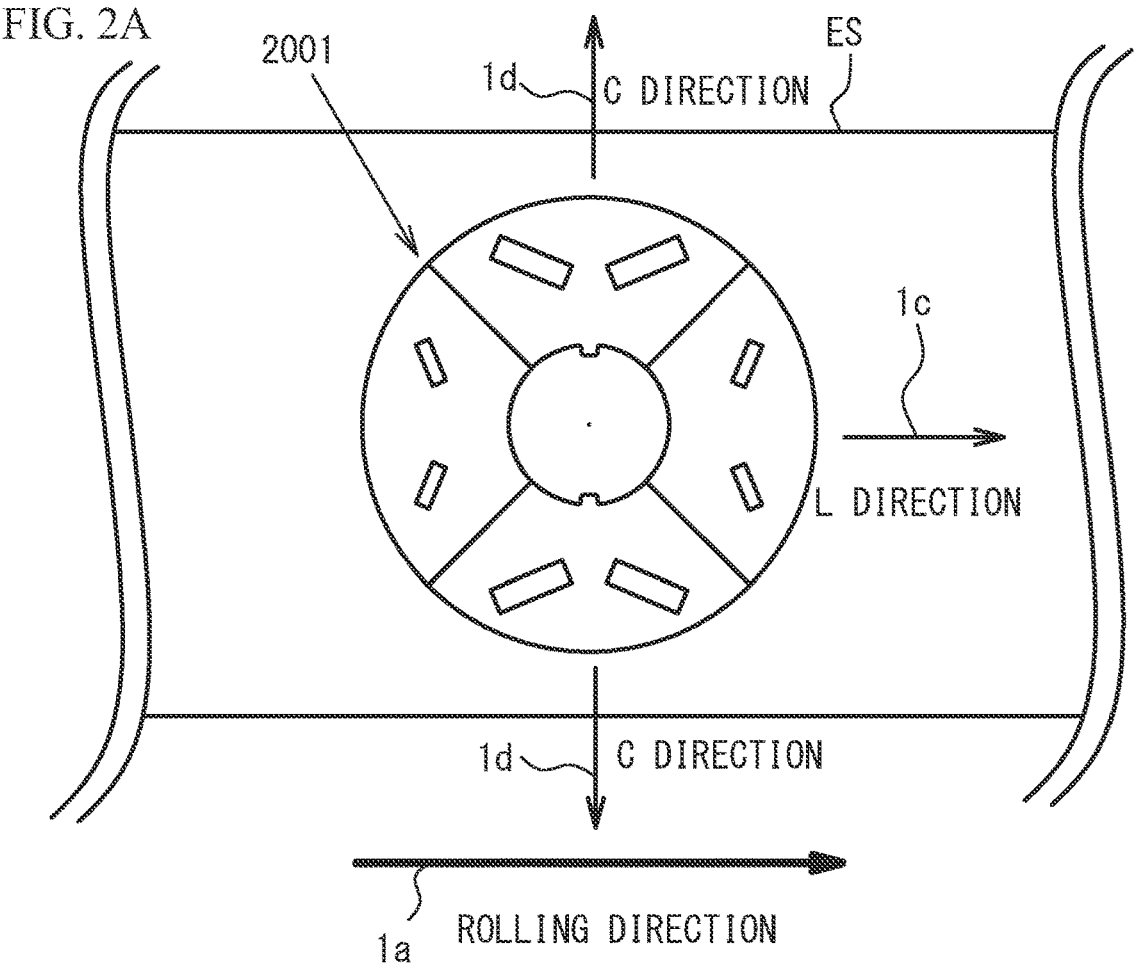
FIG. 2A is a plan view of an electromagnetic steel sheet blank from which a punched electromagnetic steel sheet forming the rotor core of the first embodiment is punched.

The rotor core 20 is formed by stacking a plurality of electromagnetic steel sheets (hereinafter referred to as "punched electromagnetic steel sheets") 2001 punched out from an electromagnetic steel sheet blank ES illustrated in FIG. 2A and FIG. 2B. In this case, as illustrated in FIG. 1B, the axial direction in which the axis line AX extends is the stacking direction of the punched electromagnetic steel sheets 2001. FIG. 1B schematically illustrates a state in which the punched electromagnetic steel sheets 2001 are stacked. Therefore, FIG. 1B does not illustrate the actual number of stacked layers. The number of the punched electromagnetic steel sheets 2001 that are stacked is appropriately set according to the specifications of the rotor core 20.

Figure 2B:
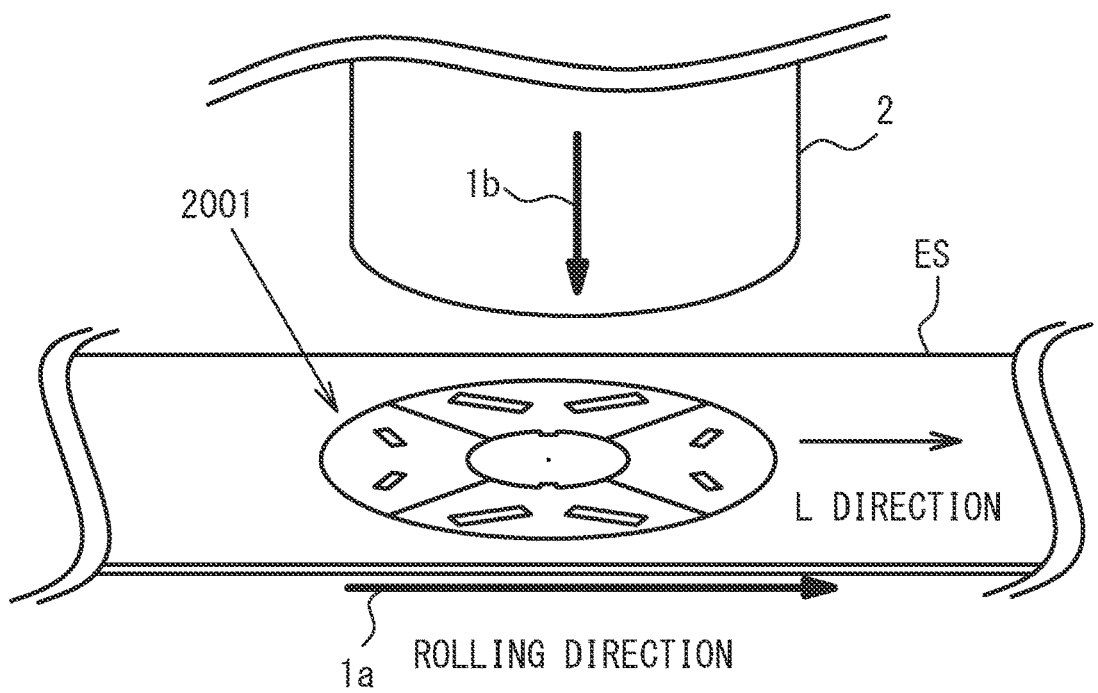
FIG. 2B is a perspective view schematically illustrating how the punched electromagnetic steel sheet is punched from the electromagnetic steel sheet blank.

As illustrated in FIG. 2B, the punched electromagnetic steel sheet 2001 is formed by punching one sheet at a time from the electromagnetic steel sheet blank ES. Here, the electromagnetic steel sheet blank ES has undergone a rolling process in its manufacturing process. As indicated by an arrow 1a in FIG. 2A, the rolling direction in the rolling process is the same as the longitudinal direction of the electromagnetic steel sheet blank ES (the left-right direction in FIG. 2A). The punched electromagnetic steel sheet 2001 is punched by lowering a punch 2 with respect to such an electromagnetic steel sheet blank ES as indicated by an arrow 1b. Here, the direction indicated by an arrow 1c in FIG. 2A, which is the same direction as the rolling direction in the punched electromagnetic steel sheet 2001, is referred to as an L direction. A direction obtained by rotating the L direction by 90° and indicated by an arrow 1d is referred to as a C direction.

In the present embodiment, the L direction is defined as the first direction. The C direction is defined as the second direction. Therefore, as illustrated in FIG. 1A, the direction in which the d-axis extends in the first magnetic pole portion 5a is the L direction. The direction in which the d-axis extends in the second magnetic pole portion 5b is the C direction. Thus, the first magnetic pole portion 5a is formed in a region including the L direction, i.e., the first direction. The second magnetic pole portion 5b is formed in a region including the C direction, i.e., the second direction.

[Anisotropy of Electromagnetic Steel Sheet]

Here, the anisotropy of the electromagnetic steel sheet will be described. It is known that an electromagnetic steel sheet exhibits various anisotropies depending on the material and the rolling process. The electromagnetic steel sheet blank ES used in the present embodiment exhibits anisotropy in magnetic characteristics and mechanical strength characteristics. The magnetic characteristic is the ease of flow of a magnetic flux through a magnetic path in a material, and may be referred to as a magnetic saturation characteristic or a magnetic flux density characteristic. The mechanical strength characteristics are characteristics evaluated in the fields of material mechanics and material strength, such as tensile strength, compressive strength, and shear strength.

The magnetic characteristics of the electromagnetic steel sheet blank ES of the present embodiment exhibit the order that the magnetic characteristic in the C direction<the magnetic characteristic in the L direction. That is, the magnetic characteristic in the C direction is lower than the magnetic characteristic in the L direction, and the magnetic flux is less likely to flow in the C direction than in the L direction.

On the other hand, the mechanical strength characteristics of the electromagnetic steel sheet blank ES of the present embodiment exhibit the order that the strength in the C direction>strength in the L direction. That is, the strength in the C direction is higher than the strength in the L direction.

[Rotational Buildup Structure]

Figure 3:
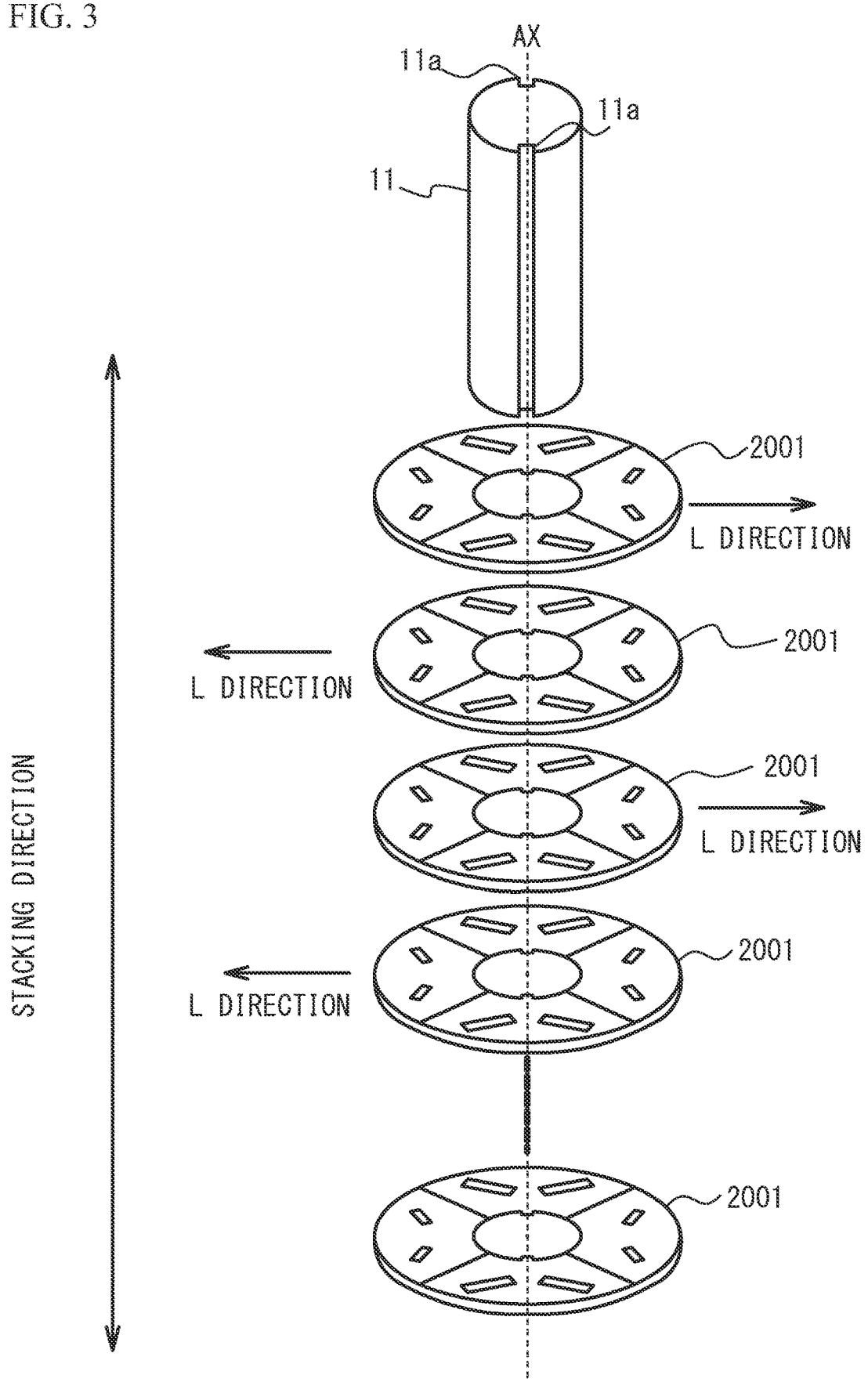
FIG. 3 is an explanatory view schematically illustrating rotational buildup in which punched electromagnetic steel sheets forming the rotor core in the first embodiment are rotated one by one by 180° and stacked.

As illustrated in FIG. 3, the punched electromagnetic steel sheets 2001 punched from the electromagnetic steel sheet blank ES in the manner illustrated in FIG. 2B are stacked while being rotated by 180° one by one as illustrated in FIG. 3. As a result, in the rotor core 20 in which the punched electromagnetic steel sheets 2001 are stacked, two locations where the L directions coincide with each other are formed at an interval of 180°. Each of the magnetic pole portions formed at these two locations is the first magnetic pole portion 5a. In addition, by stacking the punched electromagnetic steel sheets 2001 while rotating them by 180° one by one, two locations where the C directions coincide with each other are formed at an interval of 180° in the rotor core 20. Each of the magnetic pole portions formed at these two locations is the second magnetic pole portion 5b.

The rotational buildup is also performed in the conventional rotor core. The rotational buildup cancels the shape characteristics of the respective punched electromagnetic steel sheets 2001, and allows the punched electromagnetic steel sheets 2001 to be stacked in a stable state. As illustrated in FIG. 2B, the punched electromagnetic steel sheet 2001 is formed by punching. At that time, the influence of the processing, such as a slightly rounded or slightly warped peripheral portion, remains on the punched electromagnetic steel sheet 2001. The punched electromagnetic steel sheets 2001 to be stacked are all affected by processing. For this reason, when the punched electromagnetic steel sheets 2001 are stacked in the same direction, there is a possibility that stable stacking cannot be performed because of, for example, inclination in a specific direction. Therefore, in order to stack the punched electromagnetic steel sheets 2001 in a stable state, rotational buildup is performed.

Here, there is a manufacturing reason for the rotation by 180°. In the present embodiment, the rotation shaft member 11 is attached to the rotor core 20 by fitting the key grooves 11a of the rotation shaft member 11 into the key projections 21a (see FIG. 1A) provided at positions separated by 180°. Therefore, in the present embodiment, for example, it is not possible to adopt a mode in which the punched electromagnetic steel sheets 2001 are stacked while being rotated by 90° or another angle, and rotational buildup in which the punched electromagnetic steel sheets are rotated by 180° is adopted. Here, it is conceivable to change the angle of rotation by increasing the number of key projections. However, in this case, the number of key grooves formed in the rotation shaft member increases. As a result, the number of processing steps for the rotation shaft member increases, and the manufacturing cost also increases. In view of the above, it is difficult to increase the number of key projections.

Note that, for example, when the work accuracy of punching is high, or when stable buildup can be ensured, such as when the number of stacked sheets is small, it is conceivable to stack the punched electromagnetic steel sheets 2001 without rotating them. Also in this case, the rotor core 20 similar to that in the case of 180°-rotational buildup is obtained.

[Permanent Magnet]

The first magnetic pole portion 5a has two first magnet-mounting holes 22a. The two first magnet-mounting holes 22a are provided line-symmetrically with respect to the d-axis. A first permanent magnet 22 is mounted in each of the two first magnet-mounting holes 22a. The second magnetic pole portion 5b has two second magnet-mounting holes 23a. The two second magnet-mounting holes 23a are provided line-symmetrically with respect to the d-axis. A second permanent magnet 23 is mounted in each of the two second magnet-mounting holes 23a. The first permanent magnet 22 and the second permanent magnet 23 in the present embodiment are formed of the same kind of material.

Here, the total magnetic flux amount $\Phi 1$ per pole of the first magnetic pole portion 5a is compared with the total magnetic flux amount $\Phi 2$ per pole of the second magnetic pole portion 5b. The total magnetic flux amount $\Phi 2$ of the magnets per pole of the second magnetic pole portion 5b is larger than the total magnetic flux amount $\Phi 1$ of the magnets per pole of the first magnetic pole portion 5a. The total magnetic flux amount refers to all magnetic fluxes flowing through the entire permanent magnets provided in each magnetic pole. As the total magnetic flux amount is larger, the magnetic force of the magnet is stronger. In this embodiment, the first magnetic pole portion 5a is provided with two first permanent magnets 22 per pole. Therefore, the sum of the magnetic fluxes flowing through the two first permanent magnets 22 is the total magnetic flux amount $\Phi 1$ per pole of the first magnetic pole portion 5a. Similarly, in the present embodiment, the second magnetic pole portion 5b is provided with two second permanent magnets 23 per pole. Therefore, the sum of the magnetic fluxes flowing through the two second permanent magnets 23 is the total magnetic flux amount $\Phi 2$ per pole of the second magnetic pole portion 5b.

In the present embodiment, the total magnetic flux amount $\Phi 1$ per pole of the first magnetic pole portion 5a and the total magnetic flux amount $\Phi 2$ per pole of the second magnetic pole portion 5b are set to have the above relationship for the following reason. The rotor core 20 of the present embodiment is formed by stacking the punched electromagnetic steel sheets 2001 having anisotropy as described above. Therefore, in the rotor core 20 in a state where the first permanent magnets 22 and the second permanent magnets 23 are not mounted, magnetic flux is less likely to flow in the second magnetic pole portions 5b than in the first magnetic pole portions 5a.

Therefore, in the present embodiment, the total magnetic flux amount $\Phi 2$ of the magnets per pole of the second magnetic pole portion 5b is set to be larger than the total magnetic flux amount $\Phi 1$ of the magnets per pole of the first magnetic pole portion 5a in order to cancel out the influence of anisotropy on the magnetic characteristics of the punched electromagnetic steel sheet 2001.

Figure 4:
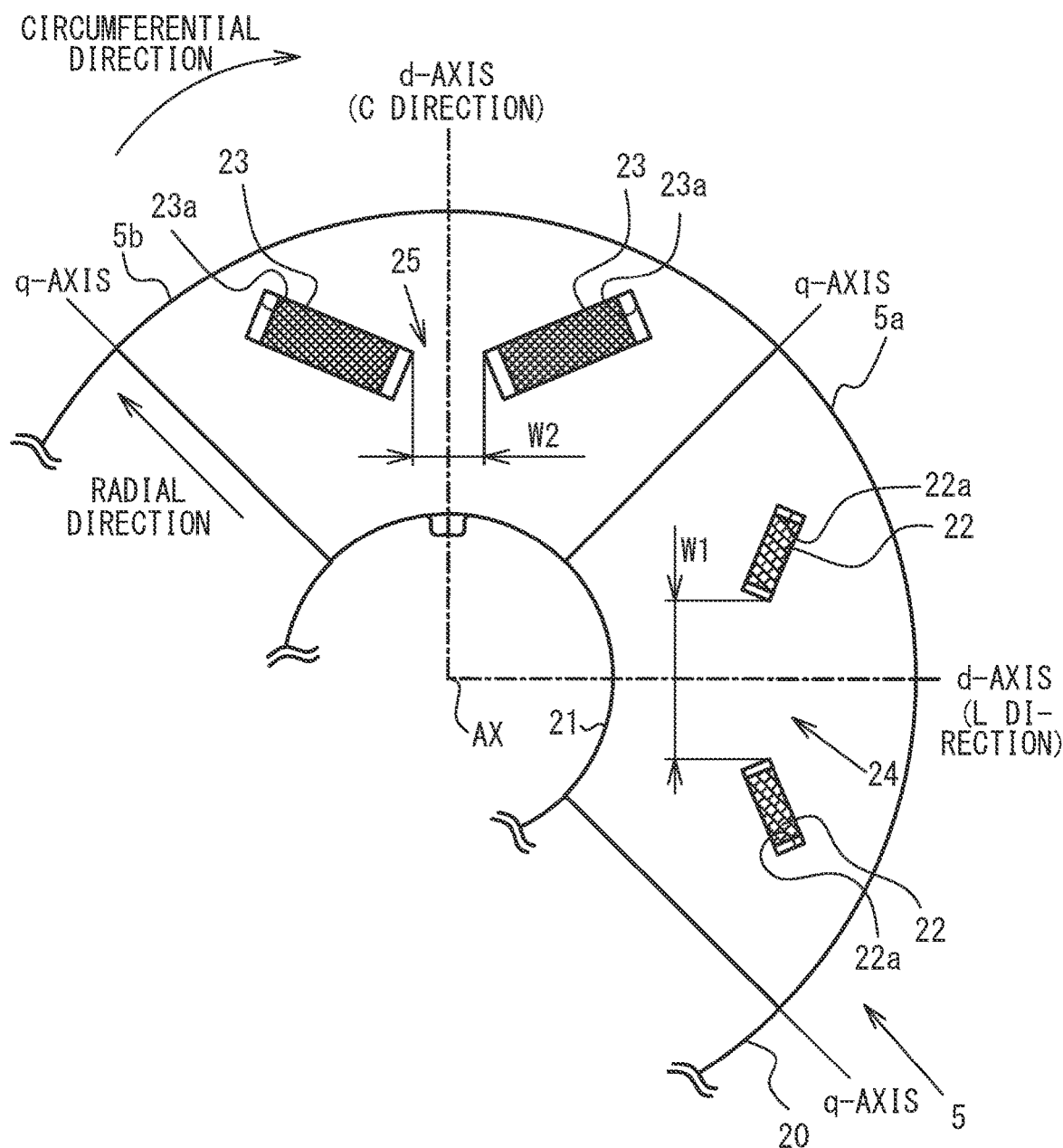
FIG. 4 is an enlarged cross-sectional view illustrating a part of the rotor of the first embodiment.

In the present embodiment, the relationship between the total magnetic flux amount Φ1 and the total magnetic flux amount Φ2 is defined by the relationship between the total cross-sectional areas of the magnets per pole of the magnetic pole portions in the cross section orthogonal to the stacking direction of the punched electromagnetic steel sheets 2001 in the rotor core 20. To be specific, the sum of the cross-sectional areas of the second permanent magnets 23 indicated by hatching in the second magnetic pole portion 5*b* illustrated in FIG. 4 is larger than the sum of the cross-sectional areas of the first permanent magnets 22 indicated by hatching in the first magnetic pole portion 5*a*.

With such a configuration, in a state in which the permanent magnet is mounted in each of the magnetic pole portions, the magnetic characteristics of the magnetic pole portions become close to each other, and the magnetic characteristics are leveled. As a result, the torque ripple is reduced and smooth rotation of the rotor 5 is achieved.

Figure 5A:
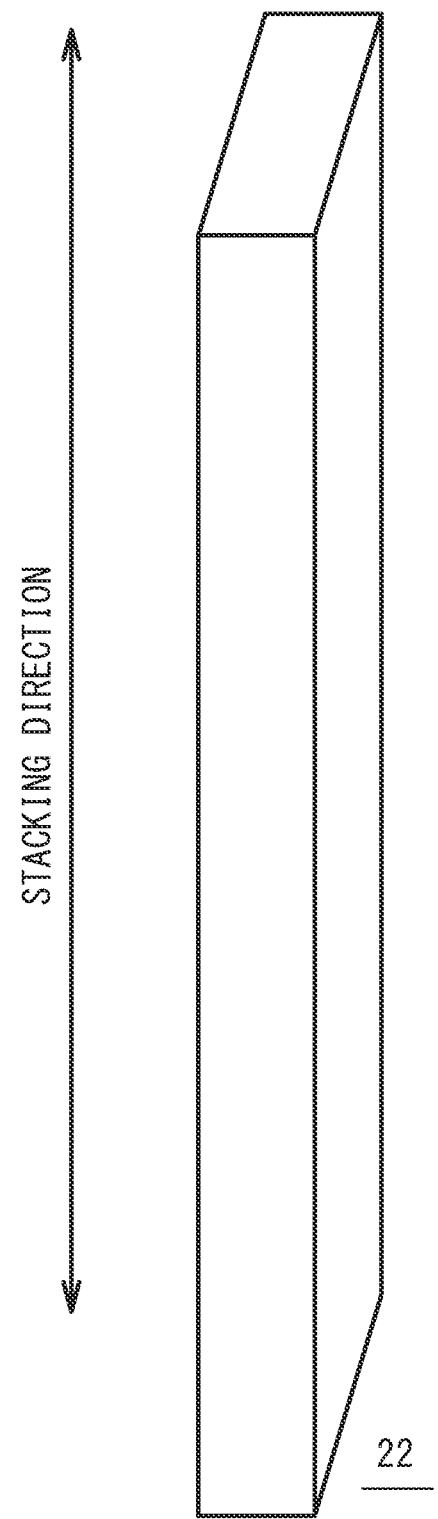
FIG. 5A is a perspective view of a first permanent magnet included in the rotor of the first embodiment.
Figure 5B:
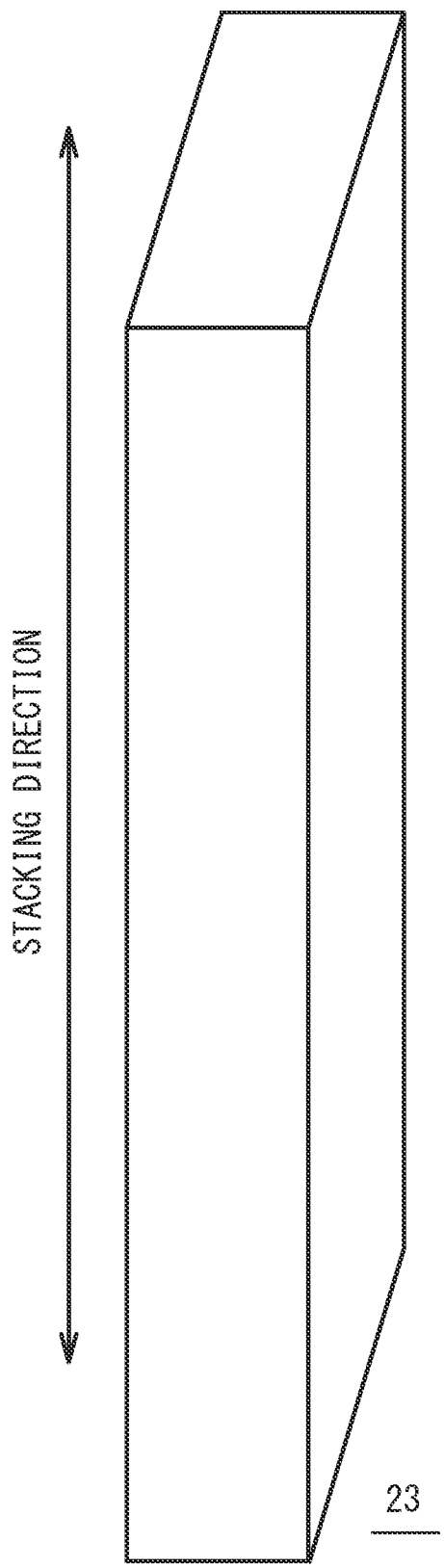
FIG. 5B is a perspective view of a second permanent magnet included in the rotor of the first embodiment.

In the present embodiment, the number of the first permanent magnets 22 and the number of the second permanent magnets 23 are the same, and the first permanent magnets 22 and the second permanent magnets 23 are made of the same kind of material. Each of the first permanent magnet 22 and the second permanent magnet 23 has a rectangular parallelepiped shape. However, as illustrated in FIG. 5A and FIG. 5B, the dimensions of the first and second permanent magnets 22 and 23 are different. Therefore, when the first permanent magnet 22 and the second permanent magnet 23 are compared, not only their cross-sectional areas but also their volumes and weights are different. Therefore, when the magnets mounted in the first magnetic pole portion 5*a* and the magnets mounted in the second magnetic pole portion 5*b* are made of the same kind of material, the total magnetic flux amount may be evaluated based on the volumes or weights thereof. For example, the relationship between the total magnetic flux amount Φ2 and the total magnetic flux amount Φ1 may be adjusted to be a desired relationship by making the weights of the permanent magnets mounted in the second magnetic pole portion 5*b* larger than the weights of the permanent magnets mounted in the first magnetic pole portion 5*a*.

Figure 6:
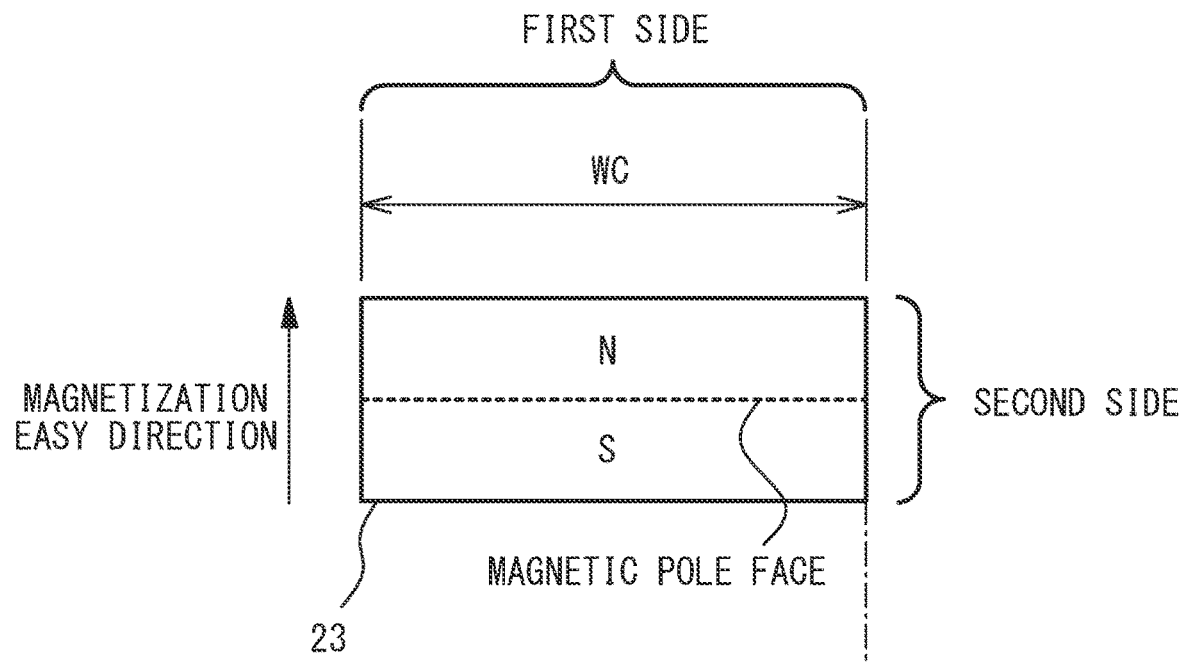
FIG. 6 is an explanatory view illustrating a comparison between the length of a first side of the first permanent magnet and the length of a first side of the second permanent magnet.
Figure 6:
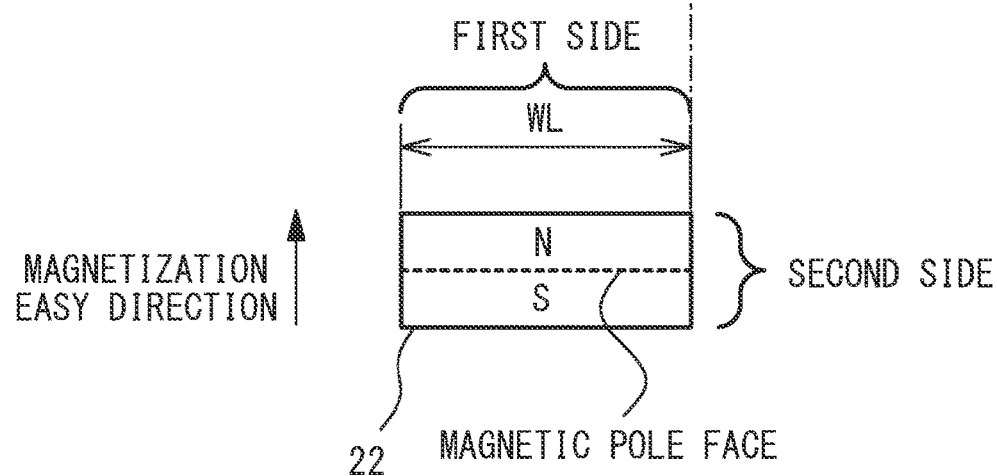

The amount of magnetic flux of the magnet is affected by various elements of the magnet. For example, the length of a side of the permanent magnet in a direction along the magnetic pole face affects the amount of magnetic flux of the magnet. With reference to FIG. 6, each of the first permanent magnet 22 and the second permanent magnet 23 has a rectangular shape when viewed in a cross section orthogonal to the stacking direction of the punched electromagnetic steel sheets 2001, and has a first side and a second side. The first side is a long side extending in a direction along the magnetic pole face, and the second side is a short side extending in a direction along the magnetization easy direction. A north (N) pole and a south (S) pole are formed along the short side direction in each permanent magnet. The direction in which a magnetic flux flows between the N pole and the S pole in each permanent magnet is the magnetization easy direction. The direction perpendicular to the magnetization easy direction is the direction along the magnetic pole face. In the permanent magnet, as the first side becomes longer, the amount of magnetic flux increases. Therefore, in the present embodiment, the first side of the second permanent magnet 23 is longer than the first side of the first permanent magnet 22. Thus, the relationship between the total magnetic flux amount Φ2 and the total magnetic flux amount Φ1 becomes a desired relationship.

In the present embodiment, the number of the first permanent magnets 22 mounted in the first magnetic pole portion 5*a* is the same as the number of the second permanent magnets 23 mounted in the second magnetic pole portion 5*b*. For this reason, a difference is provided in the total magnetic flux amount by making the dimensions of the first and second permanent magnets 22 and 23 different. Alternatively, the number of permanent magnets may be made different between the first magnetic pole portion 5*a* and the second magnetic pole portion 5*b* to provide a difference in the total magnetic flux amount. In this case, permanent magnets having the same materials, dimensions, and shapes are employed as the magnets to be mounted in the first magnetic pole portion 5*a* and the second magnetic pole portion 5*b*.

In short, it is only required that the total magnetic flux amount Φ2 of the magnets per pole of the second magnetic pole portion 5*b* is larger than the total magnetic flux amount Φ1 of the magnets per pole of the first magnetic pole portion 5*a*.

[Center Bridge]

With reference to FIG. 4, the first magnetic pole portion 5*a* in the rotor 5 has the first magnet-mounting holes 22*a* adjacent to each other across the d-axis extending along the radial direction. A first center bridge 24 is formed between the adjacent first magnet-mounting holes 22*a*. The second magnetic pole portion 5*b* of the rotor 5 has the second magnet-mounting holes 23*a* adjacent to each other across the d-axis extending in the radial direction. A second center bridge 25 is formed between the adjacent second magnet-mounting holes 23*a*. The width W1 in the circumferential direction of the first center bridge 24 is wider than the width W2 in the circumferential direction of the second center bridge 25. Here, the width W1 in the circumferential direction of the first center bridge 24 is the shortest distance between the first magnet-mounting holes 22*a* adjacent to each other across the d-axis. The width W2 in the circumferential width of the second center bridge 25 is the shortest distance between the second magnet-mounting holes 23*a* adjacent to each other across the d-axis.

The radial direction of the first center bridge 24 coincides with the L direction, and the radial direction of the second center bridge 25 coincides with the C direction. In the rotor core 20 of the present embodiment, the mechanical strength characteristic in the C direction is higher than the mechanical strength characteristic in the L direction. Therefore, the width W1 in the circumferential direction of the first center bridge 24 extending along the L direction, in which the mechanical strength characteristic is lower, is set to be wider than the width W2 in the circumferential direction of the second center bridge 25 extending along the C direction, in which the mechanical strength characteristic is higher. Thus, the strength of the first center bridge 24 can be ensured.

When the first permanent magnet 22 is viewed in a plan view of the rotor 5, that is, when viewed in a direction along the axis line AX, gaps are provided on both sides of the first permanent magnet 22 in the longitudinal direction of the first magnet-mounting hole 22*a*. Similarly, gaps are provided on both sides of the second permanent magnet 23 in the longitudinal direction of the second magnet-mounting hole 23*a*. Each of these gaps is a flux barrier. The rotor 5 may have no flux barrier.

In the rotor 5 of the present embodiment, the total magnetic flux amount Φ2 of the magnets per pole of the second magnetic pole portion 5*b* is larger than the total magnetic flux amount Φ1 of the magnets per pole of the first magnetic pole portion 5a. As a result, the magnetic characteristics between the magnetic pole portions are leveled, torque ripple is reduced, and smooth rotation of the rotor 5 is achieved.

Second Embodiment

Figure 7:
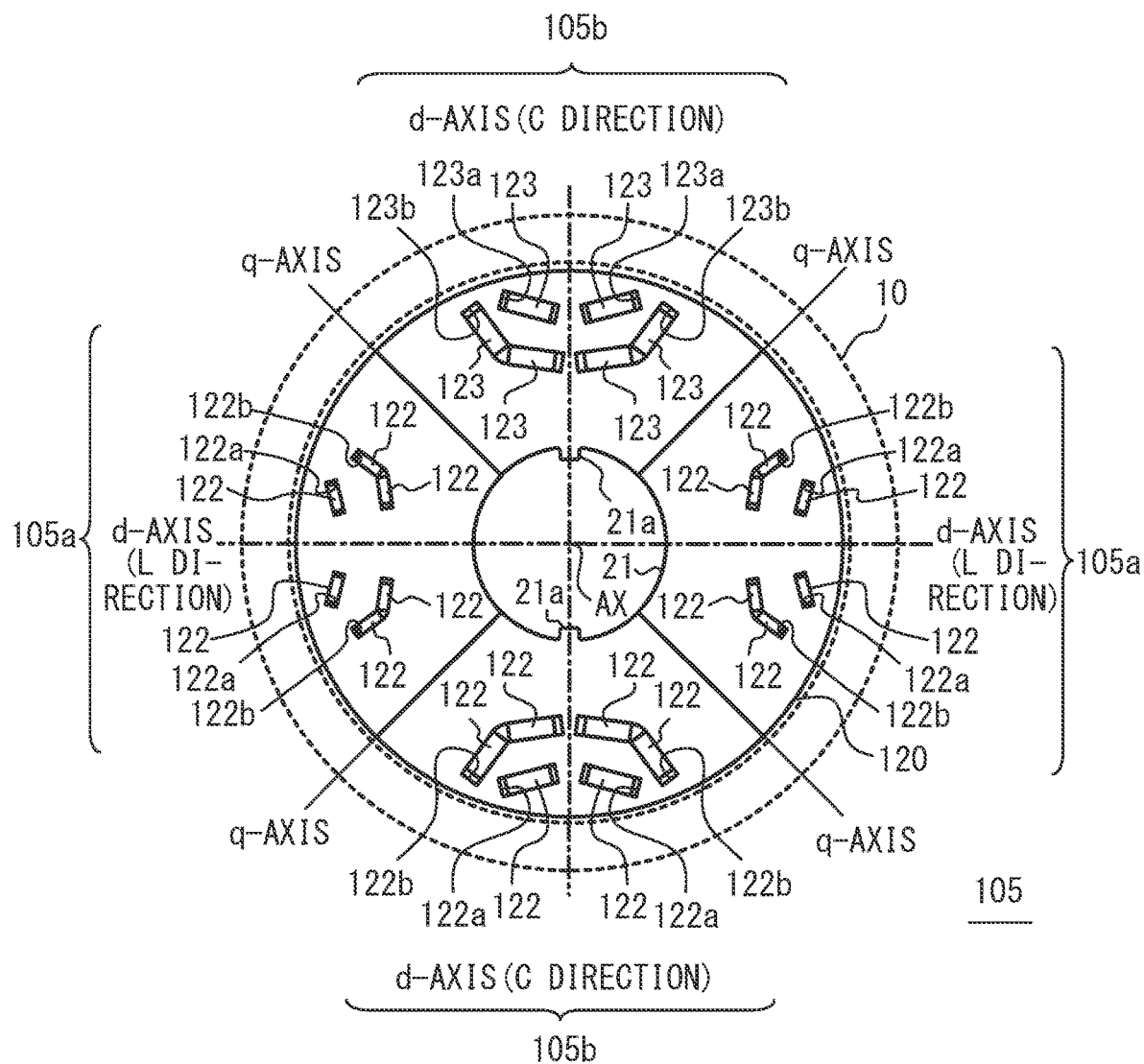
FIG. 7 is a cross-sectional view of a rotor of a second embodiment taken in a direction orthogonal to the stacking direction of the electromagnetic steel sheets.

Next, a rotor 105 in accordance with a second embodiment will be described with reference to FIG. 7 and FIG. 8. The rotor 105 of the second embodiment includes first magnetic pole portions 105a and second magnetic pole portions 105b instead of the first magnetic pole portions 5a and the second magnetic pole portions 5b in the first embodiment.

The first magnetic pole portion 105a has third magnet-mounting holes 122a and fourth magnet-mounting holes 122b. The fourth magnet-mounting holes 122b are located radially further inward than the third magnet-mounting holes 122a. The third magnet-mounting holes 122a are provided line-symmetrically with respect to the d-axis extending along the L direction, and the fourth magnet-mounting hole 122b are provided line-symmetrically with respect to the d-axis extending along the L direction.

One third permanent magnet 122 is mounted in each of the third magnet-mounting holes 122a. Two third permanent magnets 122 are mounted in each of the fourth magnet-mounting holes 122b. Therefore, the number of the third permanent magnets 122 per pole of the first magnetic pole portion 105a is six.

The second magnetic pole portion 105b has two fifth magnet-mounting holes 123a and two sixth magnet-mounting holes 123b. The sixth magnet-mounting holes 123b are located radially further inward than the fifth magnet-mounting holes 123a. The two fifth magnet-mounting holes 123a are provided line-symmetrically with respect to the d-axis extending along the C direction. Similarly, the two sixth magnet-mounting holes 123b are provided line-symmetrically with respect to the d-axis extending along the C-direction.

One fourth permanent magnet 123 is mounted in each of the fifth magnet-mounting holes 123a. Two fourth permanent magnets 123 are mounted in each of the sixth magnet-mounting holes 123b. Therefore, the number of the fourth permanent magnets 123 per pole of the second magnetic pole portion 105b is six.

The third permanent magnet 122 and the fourth permanent magnet 123 in the present embodiment are made of the same type of material. However, in the cross section of the rotor 105 orthogonal to the stacking direction of the punched electromagnetic steel sheets, the third permanent magnet 122 and the fourth permanent magnet 123 have similar shapes and have different cross-sectional areas.

A rotor core 120 in the second embodiment has anisotropy similar to that of the rotor core 20 of the first embodiment. That is, the magnetic characteristics in the C direction are lower than the magnetic characteristics in the L direction, and the magnetic flux is less likely to flow in the C direction than in the L direction.

Figure 8:
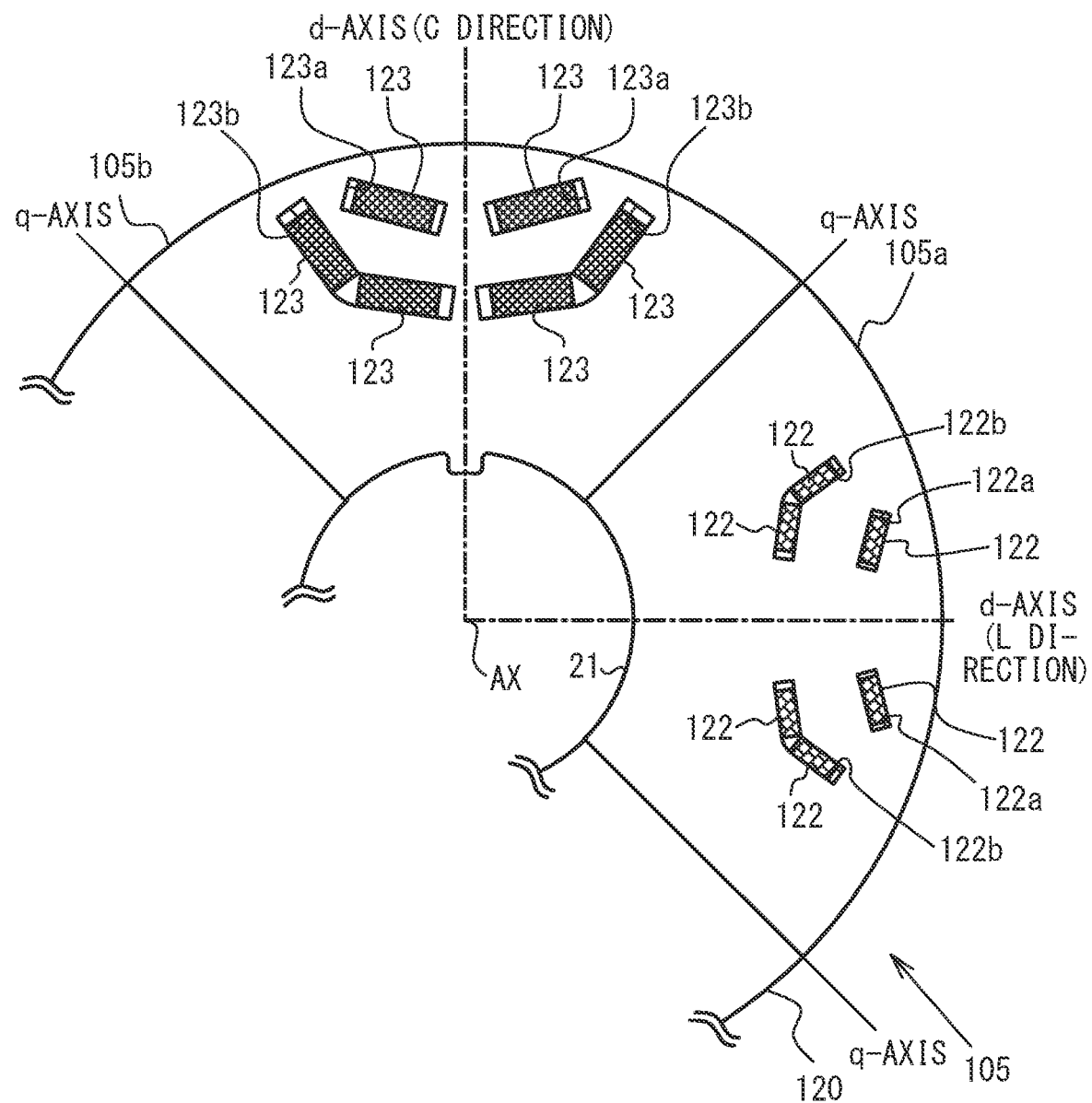
FIG. 8 is an enlarged cross-sectional view illustrating a part of the rotor of the second embodiment.

Therefore, in the second embodiment, the sum of the cross-sectional areas of the fourth permanent magnets 123 indicated by hatching in the second magnetic pole portion 105b illustrated in FIG. 8 is set larger than the sum of the cross-sectional areas of the third permanent magnets 122 indicated by hatching in the first magnetic pole portion 105a. Thus, the total magnetic flux amount Φ2 per pole of the second magnetic pole portion 105b is larger than the total magnetic flux amount Φ1 per pole of the first magnetic pole portion 105a.

As described above, even when the number of permanent magnets provided in each magnetic pole portion is increased, the total magnetic flux amount of the magnets can be adjusted by the size of the cross-sectional area.

Accordingly, in a state in which the permanent magnet is attached to each of the magnetic pole portions, the magnetic characteristics of the magnetic pole portions become close to each other, and the magnetic characteristics are leveled. As a result, the torque ripple is reduced and smooth rotation of the rotor 105 is achieved.

In the second embodiment, as in the first embodiment, the width in the circumferential direction of the first center bridge formed in the first magnetic pole portion 105a is set to be wider than the width in the circumferential direction of the second center bridge formed in the second magnetic pole portion 105b.

Third Embodiment

Next, a rotor 205 of a third embodiment will be described with reference to FIG. 9. The rotor 205 of the third embodiment includes first magnetic pole portions 205a and second magnetic pole portions 205b instead of the first magnetic pole portions 105a and the second magnetic pole portions 105b in the second embodiment.

The first magnetic pole portion 205a have two seventh magnet-mounting holes 222a. The two seventh magnet-mounting-holes 222a are provided line-symmetrically with respect to the d-axis extending along the L-direction.

Two fifth permanent magnets 222 are mounted in each of the seventh magnet-mounting holes 222a. Therefore, the number of the fifth permanent magnets 222 per pole of the first magnetic pole portion 205a is four.

The second magnetic pole portion 205b has two eighth magnet-mounting holes 223a and two ninth magnet-mounting holes 223b. The ninth magnet-mounting holes 223b are located radially further inward than the eighth magnet-mounting holes 223a. The two eighth magnet-mounting holes 223a are provided line-symmetrically with respect to the d-axis extending along the C direction. Similarly, the two ninth magnet-mounting holes 223b are provided line-symmetrically with respect to the d-axis extending along the C-direction.

One fifth permanent magnet 222 is mounted in each of the eighth magnet-mounting holes 223a. Two fifth permanent magnets 222 are mounted in each of the ninth magnet-mounting holes 223b. Therefore, the number of the fifth permanent magnets 222 per pole of the second magnetic pole portion 205b is six.

In the present embodiment, the magnets mounted in each magnetic pole portion are all fifth permanent magnets. That is, all the permanent magnets are made of the same type of material. In addition, in the cross section of the rotor 205 orthogonal to the stacking direction of the punched electromagnetic steel sheets, the cross-sectional areas are the same.

A rotor core 220 in the third embodiment has anisotropy similar to that of the rotor core 20 of the first embodiment and the rotor core 220 of the second embodiment. That is, the magnetic characteristics in the C direction are lower than the magnetic characteristics in the L direction, and the magnetic flux is less likely to flow in the C direction than in the L direction.

Figure 9:
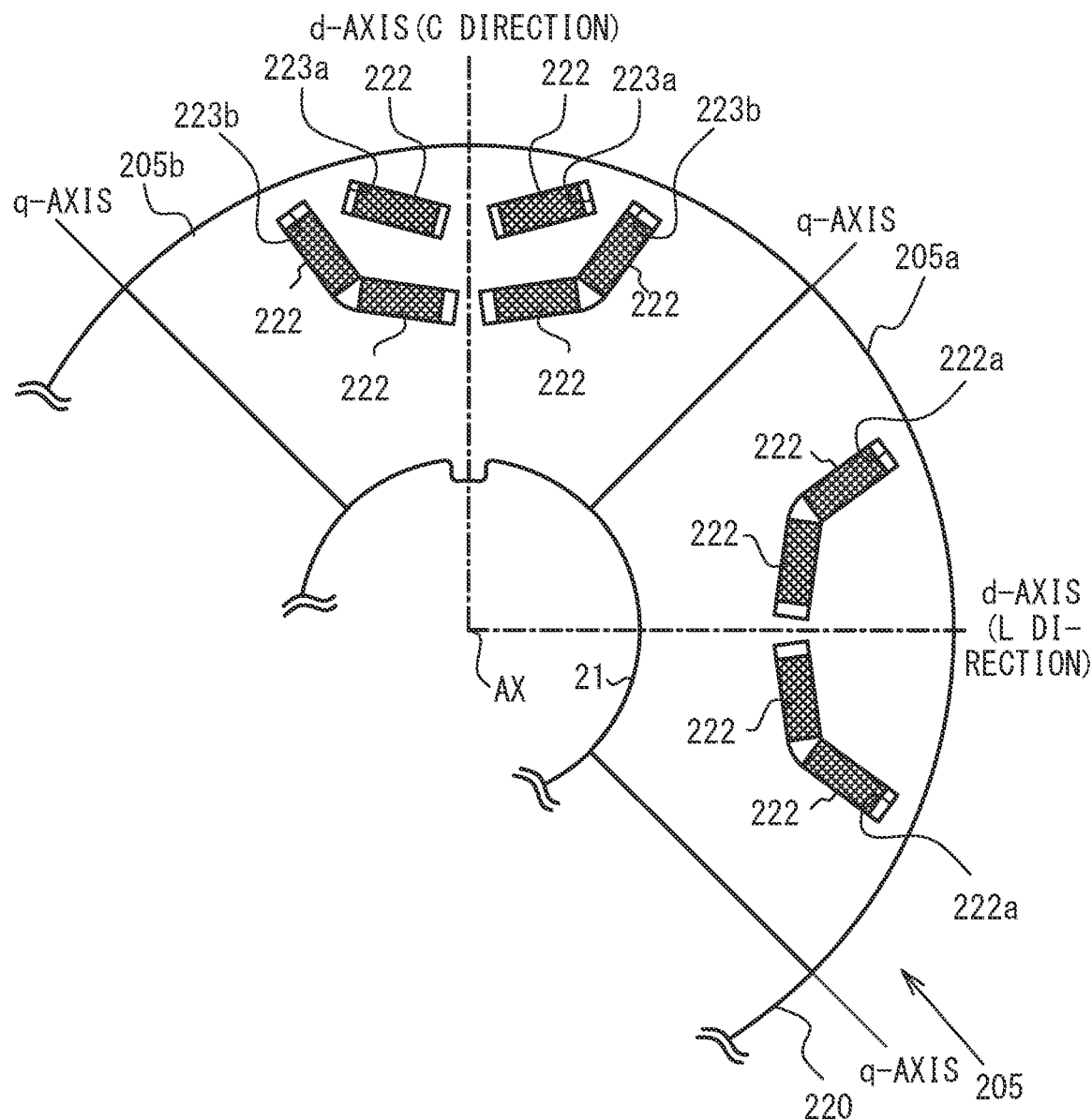
FIG. 9 is an enlarged cross-sectional view illustrating a part of the rotor of a third embodiment.

Therefore, in the third embodiment, the sum of the cross-sectional areas of the fifth permanent magnets 222 indicated by hatching in the second magnetic pole portion 205*b* illustrated in FIG. 9 is set larger than the sum of the cross-sectional areas of the fifth permanent magnets 222 indicated by hatching in the first magnetic pole portion 205*a*. Thus, the total magnetic flux amount Φ2 per pole of the second magnetic pole portion 205*b* is made larger than the total magnetic flux amount Φ1 per pole of the first magnetic pole portion 205*a*.

With this configuration, in a state in which the permanent magnets are mounted in each of the magnetic pole portions, the magnetic characteristics of the magnetic pole portions become close to each other, and the magnetic characteristics are leveled. As a result, the torque ripple is reduced and smooth rotation of the rotor 205 is achieved.

Here, when the third embodiment is compared with the first embodiment and the second embodiment, there are the following differences. In the first and second embodiments, the number of permanent magnets per pole of the magnetic pole portion is the same between the first magnetic pole portion and the second magnetic pole portion. However, the cross-sectional area of each permanent magnet provided in the first magnetic pole portion and the cross-sectional area of each permanent magnet provided in the second magnetic pole portion are different from each other. On the other hand, in the third embodiment, the number of permanent magnets per pole of the magnetic pole portion is different between the first magnetic pole portion and the second magnetic pole portion. Thus, the total cross-sectional area per pole of the second magnetic pole portion 205*b* is set larger than the total cross-sectional area per pole of the first magnetic pole portion 205*a*.

The total area per pole of the magnetic pole portion can be variously set by combining the cross-sectional areas of the individual permanent magnets and the number of permanent magnets. Therefore, the individual cross-sectional areas of the permanent magnets and the number of the permanent magnets can be appropriately combined so that the total cross-sectional area per pole of the second magnetic pole portion is larger than the total cross-sectional area per pole of the first magnetic pole portion.

Fourth Embodiment

Figure 10:
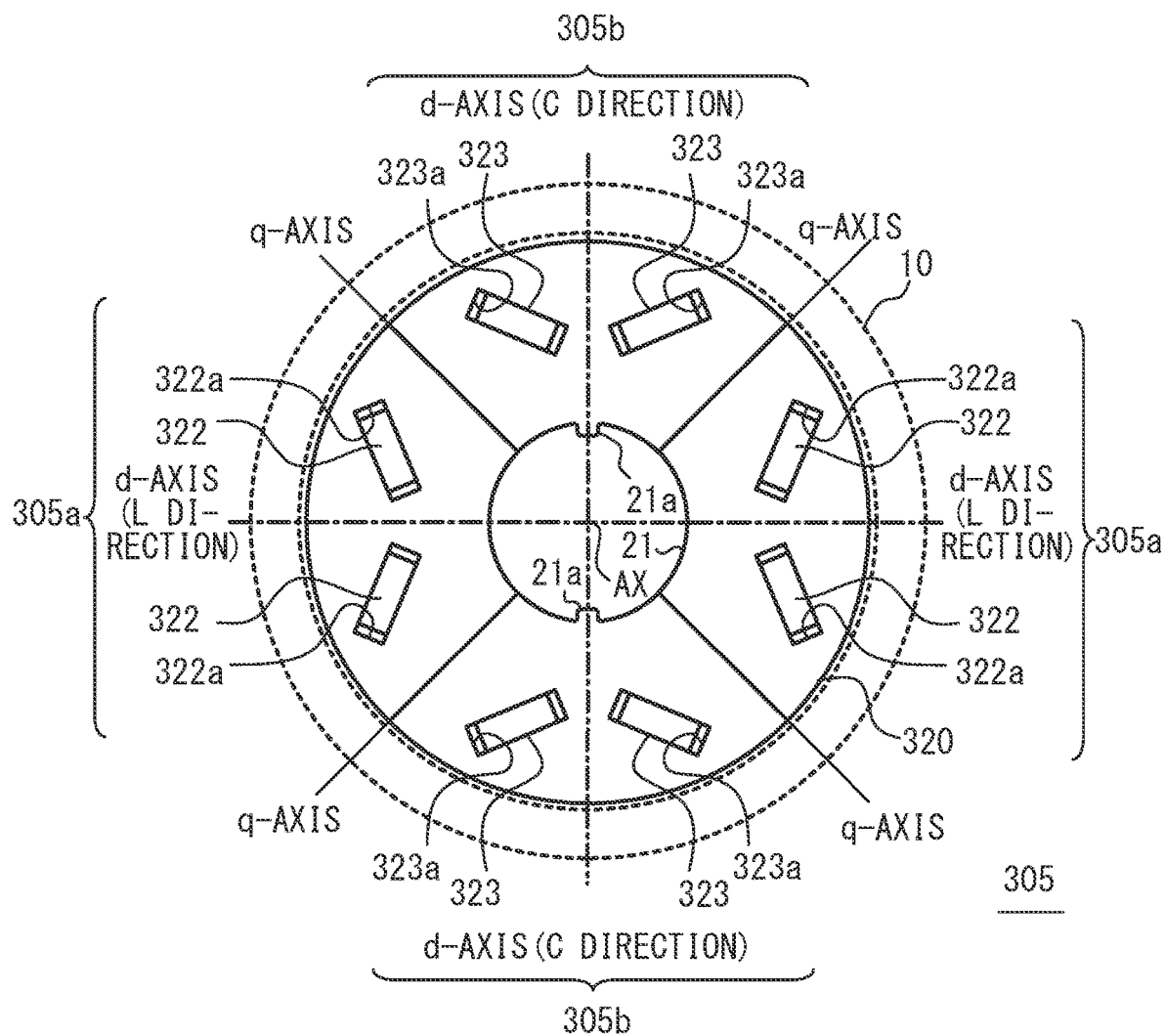
FIG. 10 is a cross-sectional view of a rotor of a fourth embodiment taken in a direction orthogonal to the stacking direction of the electromagnetic steel sheets.

Next, a rotor 305 in accordance with a fourth embodiment will be described with reference to FIG. 10 to FIG. 11B. The rotor 305 of the fourth embodiment includes first magnetic pole portions 305*a* and second magnetic pole portions 305*b* instead of the first magnetic pole portions 5*a* and the second magnetic pole portions 5*b* in the first embodiment.

The first magnetic pole portion 305*a* has tenth magnet-mounting holes 322*a*. The tenth magnet-mounting holes 322*a* are provided line-symmetrically with respect to the d-axis extending along the L-direction. One sixth permanent magnet 322 is mounted in each of the tenth magnet-mounting holes 322*a*.

The second magnetic pole portion 305*b* has eleventh magnet-mounting holes 323*a*. The eleventh magnet-mounting holes 323*a* are provided line-symmetrically with respect to the d-axis extending along the C direction. One seventh permanent magnet 323 is mounted in each of the eleventh magnet-mounting hole 323*a*.

The sixth permanent magnet 322 and the seventh permanent magnet 323 in the present embodiment have the same dimensions. Therefore, in the cross section of the rotor 305 orthogonal to the stacking direction of the punched electromagnetic steel sheets, the cross-sectional area of the sixth permanent magnet 322 and the cross-sectional area of the seventh permanent magnet 323 are the same.

A rotor core 320 in the fourth embodiment has anisotropy similar to that of the rotor core 20 of the first embodiment. That is, the magnetic characteristics in the C direction are lower than the magnetic characteristics in the L direction, and the magnetic flux is less likely to flow in the C direction than in the L direction.

Figure 11A:
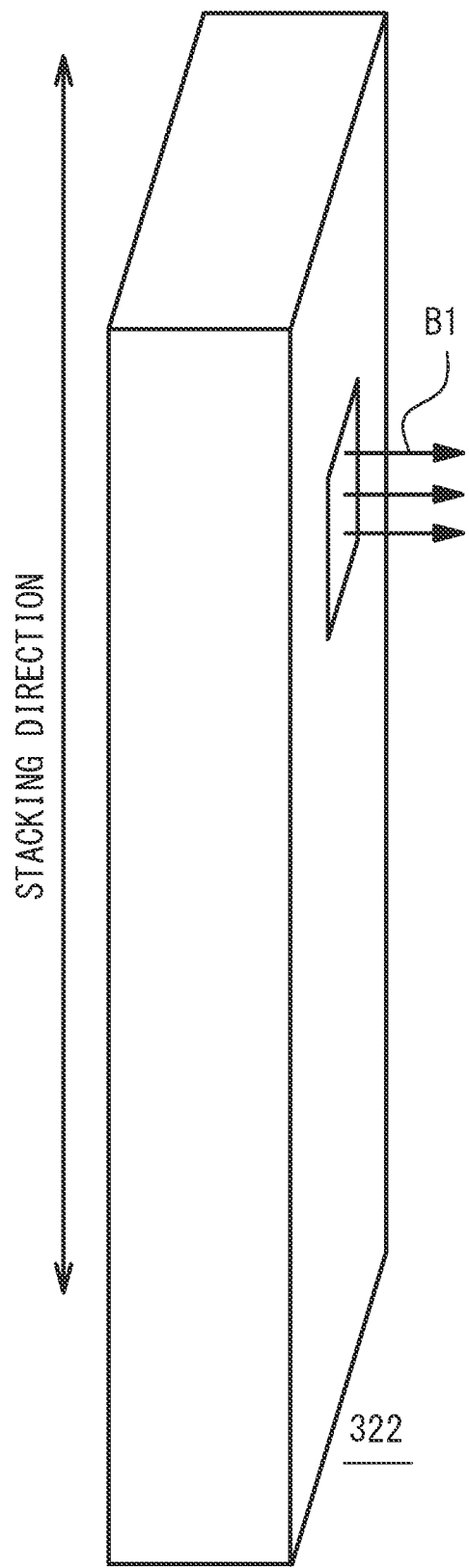
FIG. 11A is a perspective view of a sixth permanent magnet included in the rotor of the fourth embodiment.
Figure 11B:
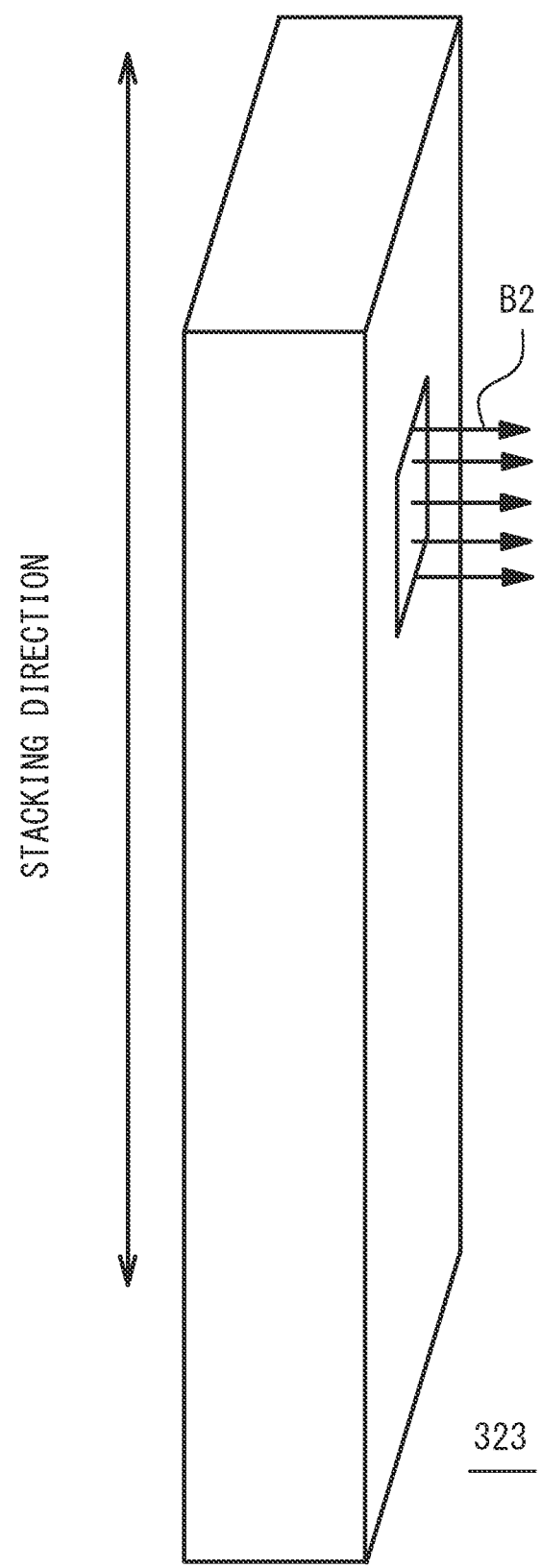
FIG. 11B is a perspective view of a seventh permanent magnet included in the rotor of the fourth embodiment.

Therefore, in the fourth embodiment, the magnetic flux density B2 of the seventh permanent magnet 323 illustrated in FIG. 11B is set higher than the magnetic flux density B1 of the sixth permanent magnet 322 illustrated in FIG. 11A. With this configuration, the total magnetic flux amount Φ2 per pole of the second magnetic pole portion 305*b* is larger than the total magnetic flux amount Φ1 per pole of the first magnetic pole portion 305*a*. The magnetic flux density indicates the strength of magnetic force, and is the amount of magnetic flux flowing per unit area. In the present embodiment, the sixth permanent magnet 322 and the seventh permanent magnet 323 have the same dimensions. Therefore, the seventh permanent magnet 323 having a higher magnetic flux density has a stronger magnetic force than the sixth permanent magnet 322.

Therefore, in a state in which the permanent magnets are mounted in each of the magnetic pole portions, the magnetic characteristics of the magnetic pole portions become close to each other, and the magnetic characteristics are leveled. As a result, the torque ripple is reduced and smooth rotation of the rotor 305 is achieved.

As described above, even when the number and dimensions of the permanent magnets provided in respective magnetic pole portions are the same, the total magnetic flux amount per pole of the magnetic pole portion can be adjusted by selecting permanent magnets having different magnetic flux densities.

The present embodiment includes the sixth permanent magnet 322 and the seventh permanent magnet 323 having the same dimensions. The number of the sixth permanent magnets 322 is the same as the number of the seventh permanent magnets 323. Here, the dimensions and the number of the permanent magnets are not necessarily the same. When permanent magnets having different magnetic flux densities are selected, the size and the number of the permanent magnets may be appropriately set according to the magnetic flux density.

Although some embodiments of the present invention have been described in detail, the present invention is not limited to the specific embodiments but may be varied or changed within the scope of the present invention as claimed.

What is claimed is:

1. A rotor comprising:
   a rotor core formed by stacking electromagnetic steel sheets having anisotropy, the anisotropy meaning that magnetic characteristics of each of the electromagnetic steel sheets in a first direction along a rolling direction are different from magnetic characteristics of each of the electromagnetic steel sheets in a second direction obtained by rotating the first direction by 90°, the rotor core having 4n (n is a natural number) magnetic pole portions formed along a circumferential direction; and
   magnets mounted in the rotor core in each of the magnetic pole portions,
   wherein the 4n magnetic pole portions include a first magnetic pole portion formed in a region including the first direction and a second magnetic pole portion formed in a region including the second direction, and wherein a total magnetic flux amount of the magnets per pole of the second magnetic pole portion is larger than a total magnetic flux amount of the magnets per pole of the first magnetic pole portion.

2. The rotor according to claim 1, wherein a total cross-sectional area of the magnets per pole of the second magnetic pole portion is larger than a total cross-sectional area of the magnets per pole of the first magnetic pole portion in a cross section orthogonal to a stacking direction of the electromagnetic steel sheets.

3. The rotor according to claim 1,
wherein a number of the magnets per pole of the first magnetic pole portion is equal to a number of the magnets per pole of the second magnetic pole portion,
wherein each of the magnets is a rectangular parallelepiped,
wherein each of the magnets has a first side extending in a direction along a magnetic pole face and a second side extending in a direction along a magnetization easy direction in a cross section orthogonal to a stacking direction of the electromagnetic steel sheets, and
wherein the first side in the second magnetic pole portion is longer than the first side in the first magnetic pole portion.

4. The rotor according to claim 1,
wherein the first magnetic pole portion includes a first center bridge formed between magnet-mounting holes adjacent to each other across a d-axis extending along a radial direction,
wherein the second magnetic pole portion includes a second center bridge formed between magnet mounting-holes adjacent to each other across a d-axis extending along a radial direction, and
wherein a width in a circumferential direction of the first center bridge is wider than a width in a circumferential direction of the second center bridge.

5. The rotor according to claim 1, wherein a magnetic flux density of the magnets mounted in the second magnetic pole portion is higher than a magnetic flux density of the magnets mounted in the first magnetic pole portion.

* * * * *